United States Patent [19]

Hector

[11] Patent Number: 4,716,792
[45] Date of Patent: Jan. 5, 1988

[54] TIRE REPAIR TOOL MEANS

[76] Inventor: Dwight H. Hector, 123 E. Dewey Dr., Ellettsville, Ind. 47429

[21] Appl. No.: 928,017

[22] Filed: Nov. 7, 1986

[51] Int. Cl.⁴ .......................................... B60C 25/16
[52] U.S. Cl. .................................................... 81/15.7
[58] Field of Search ...................... 81/15.2, 15.5, 15.7; 152/370

[56] References Cited

U.S. PATENT DOCUMENTS

| | | | |
|---|---|---|---|
| 612,587 | 10/1898 | Grimes | 81/15.7 |
| 1,545,831 | 7/1925 | Hirst | 81/15.7 |
| 2,828,657 | 4/1958 | Fromberg | 81/15.7 |
| 2,966,190 | 12/1960 | Nowotny | 81/15.7 X |
| 2,990,736 | 7/1961 | Crandall | 81/15.7 |
| 3,052,141 | 9/1962 | Mitchell | 81/15.7 |
| 3,400,445 | 9/1968 | Crandall et al. | 81/15.7 X |
| 3,542,614 | 11/1970 | Hopkins | 81/15.7 X |
| 3,545,314 | 12/1970 | Docter | 81/15.7 |
| 3,855,881 | 12/1974 | Buckland | 81/15.7 |
| 4,009,624 | 3/1977 | Nishino | 81/15.7 |

Primary Examiner—Frederick R. Schmidt
Assistant Examiner—Judy J. Hartman
Attorney, Agent, or Firm—Robert A. Spray

[57] ABSTRACT

A simple and economical tire repair tool, providing an open-ended support tube which carries in the free end a plug member axially of the tube for sealing the hole. The plug member is provided on its forward end with a hard-material pointed member for penetration of the casing, and that pointed member has an abutment against which the free end of the support tube presses during use, forcing the pointed end and a plug body connected thereto to penetrate the tire casing, without need of enlarging the hole, and with the tube holding the casing walls away from the plug body. Interengaging lugs of the tube and the pointed end member provide for twisting the pointed member to facilitate passage of the pointed member into the casing, but permit simple axial retraction of the tube to draw it out of the casing, yet the resilience of the casing in the hole region causes the casing walls to firmly embrace the plug member, sealing the hole.

6 Claims, 12 Drawing Figures

TIRE REPAIR TOOL MEANS

FIELD AND NATURE OF THE INVENTION

The present invention relates to a tire repair tool device and procedure for repairing a puncture or other hole in a tire casing; and more particularly the invention relates to and provides a tire repair kit, of simple and economical construction, yet which is easy to use, without dismantling the tire.

SUMMARY OF THE INVENTIVE CONCEPTS

The present invention provides a simple and economical tire repair kit including a hand-manipulatable handle-like device resembling a screwdriver, and a set of resilient plug members each having its own hardened forward end member for penetrating the casing; although from a conceptual standpoint the invention is describable as such a support tool and just a single one of such plug members.

The tool provides a tubular carrier member, and the plug member is inserted into the open or forward end of the carrier tube. Flanges or abutments abut one another to limit how the plug member enters the carrier tube, one of them being the end of the carrier tube and one being the rearwardly-facing end of the pointed member which is at the forward end of the plug member.

Axial lugs or flanges are provided, which interengage between the pointed member and the support tube, assuring that rotation of the carrier member will rotate the pointed member, making penetration of the casing easy, yet accommodating merely axial withdrawal of the support tube after the pointed member and the tube have been pushed forwardly to assure that the pointed member is inside the casing so that axial retraction of the carrier tube will leave the plug body sealing the casing hole.

Other details are mentioned in the more detailed description.

PRIOR ART

Ever since the advent of so-called "tubeless tires" the prior art has tried and used various means of repairing punctures of such tires.

Perhaps a typical representation of the devices and equipment for making tire repairs are those prior art devices shown from a search of the prior art as made after this invention and during consideration as to patenting the present invention; however, none of these prior references provide the present concepts, i.e., a combination of a hard-material pointed plug tip fixed onto a plug, with the plug being insertable from the casing's exterior by a support tube which carries the plug, and which also pushes onto the plug's pointed tip, and also utilizes the connection of the plug tip to the plug, and the gripping of the casing against the plug tip, to prevent the plug from following the support tube outwardly during withdrawal of the carrier or support tube.

Even further, the prior art does not show the extra feature of axial abutments of the carrier tube and pointed tip for obtaining the penetration ease of twisting the pointed tip by twisting the carrier tube, yet permitting easy axial withdrawal of the carrier tube.

Those prior references illustrate a whole variety of prior art devices; and in realistically considering the advantages and non-obvious nature of the present concepts, it is noted, as mentioned below, that this prior art summary of the 77 years from 1897 through 1974 even shows several of the concepts of the present invention, although not in the advantageous combination and operativity of the present invention.

For example, although failing to be in the present combination and operativity of the present invention, the prior art references show all the following: pointed tips for ease of penetration, a recognition that it is advantageous to avoid need of an extra hole-reaming step, a tubular support carrier for a plug, a recognition that a particular need is to hold the plug in the casing in contrast to it following a carrier tube outwardly during retraction, a recognition of the benefit of being able to achieve the entire repair by access to only the exterior of the casing, and a pointed head integral with a plug body. Nevertheless, even with all these concepts and approaches, and with multitudinuous attempts for scores of years, the prior art did not achieve the present invention.

Those prior art references are as follows:

| Patentee | U.S. Pat. No. | Year granted |
| --- | --- | --- |
| Mitchell | 3,052,141 | 1962 |
| Crandall | 2,990,736 | 1961 |
| Fromberg | 2,828,657 | 1958 |
| Nowotny | 2,966,190 | 1960 |
| Hatch | 583,438 | 1897 |
| Littlefield | 1,859,305 | 1932 |
| Fromberg | 2,828,791 | 1958 |
| Young | 1,833,194 | 1931 |
| Ranney | 1,332,412 | 1920 |
| Hirst | 1,545,831 | 1925 |
| Sutton | 725,171 | 1903 |
| Buckland | 3,855,881 | 1974 |
| Gruber | 3,013,454 | 1961 |
| Docter | 3,545,314 | 1970 |

As a short summary of factors distinguishing the present invention from each of those prior art references, it is to be noted that Mitchell uses and apparently needs a complex plug-driving equipment and a fluid pressure supply; Crandall has a manual tool, but requires a "probe" as an extra component for forcing the plug member through a carrier tube from the rear; Fromberg '657 also requires a plunger as an extra component; Nowotny uses a complex driving mechanism; Hatch provides no shielding tube facilitating the insertion of the plug; Littlefield's concepts require a dismantling step for forcing a tool outwardly from inside the tire casing; Fromberg '791 has no tip grippable by the casing during retraction, but uses a carrier and an applicator having a plunger to prevent the plug stem from pulling out during retraction; Young, similar to Littlefield, forces the plug outwardly from the interior of the casing, and uses a flexible wire for drawing the insertion shield on outwardly of the casing; Ranney uses a string to manipulate, and needs three tubular members, and although using an auxiliary pointed member, does not fasten it to the plug or use it to retain the plug; Hirst requires access to both sides of the casing; Sutton requires both a tube and an awl; Buckland uses a pointed tip member but needs a draw wire rather than using the pointed tip for being gripped by the casing to hold the plug from following the shield tube as it is withdrawn, and like Littlefield and Young, inserts from the casing's interior, and needs access to both tire faces; Gruber feels the need of the very complex forms of tools in multiple embodiments, including springs a multiplicity of tubes, etc., even though he uses a pointed penetrator;

and Docter also has a complex mechanism, and even though he uses a hardened tip, it is not connected to the plug body but to a nozzle.

Thus, although one or more of the prior art items approach one or more of the co-operating concepts or combination achieved advantageously by the present invention, none provide its combined advantages of this invention's simplicity, economy and operativity.

Accordingly, this review of what is believed to be representative prior art procedures and devices, none achieving or providing the combination herein shown to be advantageous over each of the various attempts over a long period of many years, is believed to help to emphasize the inventive nature of the present concepts, showing them unobvious even though in retrospect the concepts apart from the present combination may appear to be simple; for, instead of detracting from inventiveness, simplicity is regarded as often and element of inventiveness, especially where as here the successful concepts are a departure from prior art, and especially where the prior art over many years has used a whole variety of tire-plug procedures, some with quite complex devices, some requiring access to both sides of the tire casing, etc., and even missing the present invention of this advantageous combination incorporating a hard tip member even though even that component itself has been used.

BRIEF DESCRIPTION OF THE DRAWINGS

The above description is of somewhat introductory and generalized form, providing background of understanding particulars of the problem here solved and of the prior art. More particular details, concepts, and features of the inventive concepts are set forth in the following and more detailed description of illustrative embodiments, taken in conjunction with the accompanying drawings, which are of somewhat schematic and diagrammatic nature, and in which:

FIG. 3 illustrates the tool in use at the beginning of the puncture repair, the pointed end member being about to be forced into the puncture hole from a work position exteriorly of the tire casing, the pointed end member and its plug body having already been inserted into the tubular carrier member, and just ready to be pushed into the casing as indicated by the arrow;

FIG. 4 is a view of the parts in a subsequent stage of a tire-repair, in which the pointed end member has been forced completely through the tire casing as forced by the tubular carrier member by manual force applied to the device handle;

FIG. 5 shows a subsequent stage in which the tubular carrier member has been pulled a short distance outwardly, as indicated by the reference arrow, in an amount such that the tire casing is just "grabbing" the pointed end member, to restrain it and the plug member which it carries from further outward movement;

FIG. 6 illustrates a subsequent stage in which the tubular carrier member has been pulled further outwardly, completely out of the tire casing, but with the pointed end member and plug body still retained in the puncture hole of the casing; and FIG. 7 illustrates the completed puncture repair, with the pointed end and the plug body retained in the puncture passage in the casing, and with the un-used portion of the plug body having been snipped off;

FIG. 8 is a elevation view of the pointed end member, showing one of such lugs on its outer end which is to be fitted against the outer end of the tubular carrier member;

FIG. 9 is an end elevation view of the pointed end member of FIG. 8, showing two of the lugs, one of such lugs being shown in each of the side quadrants;

FIG. 10 is an elevation view of the forward or outer end of the tubular carrier member, showing one of such lugs in the upper and lower quadrants; and FIG. 11 is a fragmental elevational view of the forward or outer end of the tubular carrier member, showing the upper and lower lugs shown in FIG. 10.

DETAILED DESCRIPTION OF ILLUSTRATIVE EMBODIMENT

Figure 1:
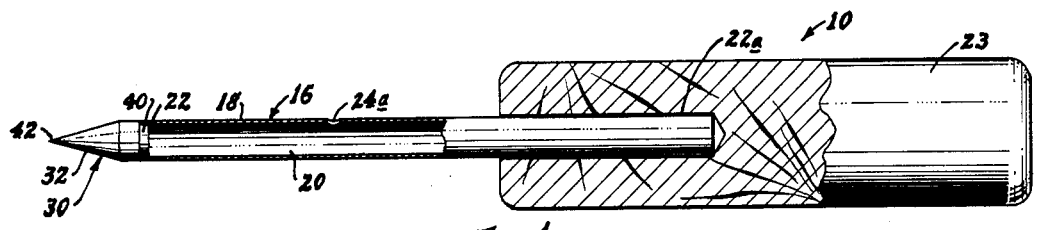
FIG. 1 is an elevation view of the tire repair tool of the present invention, including a pointed end-member of a repair plug, but not showing the repair plug body itself, parts of the handle and of the tubular plug-carrier member being shown in vertical cross-section.

As shown in the drawings, the concepts of the present invention provide a tire repair tool device or means 10 for repairing a puncture or other hole 12 in a tire casing 14, the device 10 achieving a convenience and ease of use as well as achieving a tire repair which is quite satisfactory both as to sufficiency and assuredness of the repair and the ease and rapidity of the task, yet with great economy both of the device and of the plug body.

As shown, the device 10 has a tubular carrier member 16 having a tubular exterior wall 18, and a hollow bore 20 which extends rearwardly a substantial distance from the forward end 22 of the carrier member 16, that distance being sufficient at least to fully receive a plug member 24 which is used with the carrier member 16. The tube 18 also is shown with a vent hole 24a in its inner or rear portion.

The carrier member 16 is shown as held in an axial hole 22d of a generally cylindrical manipulating handle body 23; and the combination of that handle body 23 and the carrier tube 16/18 of the device 10 has a superficial resemblance to a conventional screwdriver.

A plurality of sizes may be provided, of both the carrier member 16 and the plug 24, although the characteristics of this invention are such that only one or two sizes would be needed; for the ease of insertion of the plug member 24 into the tire casing 14, even if the casing hole 12 is quite small, is such that no extremely small size need be provided, and the weakness of a tire casing 14 if a hole is of a large size means that no large size would be practical.

For use with the carrier device 16, the plug member 24 is found to have a plug body 25, generally cylindrical in shape, and of operatively pliable material, i.e., material of a softness and flexibility such that its nature accommodates its effective sealing against the walls 26 of the casing hole 12, when used as described herein.

With reference to diametrical size of the plug body 25, as well as to the size of the tubular carrier member 16, resilient deformation of the casing wall portions 26 adjacent the hole 12 is shown herein as utilized. That is, the outer diameter of the carrier member 16 is large enough that its penetration into a casing hole 12 will resiliently stretch the adjacent casing wall portions 26; and, even further, the carrier 16 is of a size large enough that the plug body 25 itself is larger in diameter than that of the casing hole 12, all contributing to the operativity specified herein.

(The sealing operativity may be enhanced, of course, by a plug-coating of material commonly referred to as "rubber glue" or the like; but since that is well known in the prior art, and no inventiveness is asserted as to such use, the operativity here is described as the plug body 25 itself as sealing the casing hole 12 by engagement of the casing wall 26 around the hole 12.)

As shown, the plug body 25 is provided to be of slender form, whose cross-sectional size and shape is such as to be receivable within the carrier member 16's bore 20, but large enough relative to the bore 20 as to be yieldingly retained therein. Further, the body 24 is of a length to operatively be retained in the casing wall 14 when it is caused to be installed in the tire casing 14, in which installed position it is disposed in a direction generally perpendicular to the portion 28 of the tire casing 14 which has the hole 12 needing to be repaired, that being assumed as the general direction of a puncture hole 12.

Figure 7:
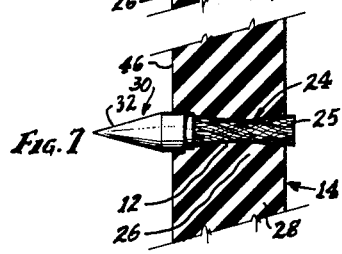
Figures 8, 9, 10, 11:
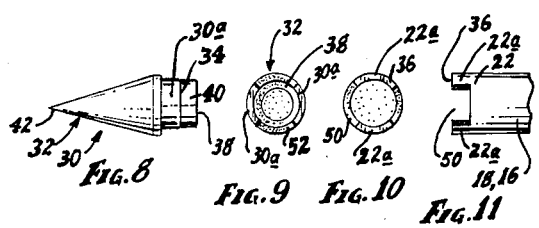
FIGS. 8 through 11 illustrate a desired embodiment in which both the pointed end member and the forward or outer end of the tubular carrier member are provided with a co-operative lug means which provide that a twist imparted to the tool handle will be transmitted to the pointed end member, causing the latter to correspondingly twist and thus providing more ease of insertion during the step which occurs between the showing of FIG. 3 and FIG. 4; and more particularly.

In accordance with the concepts of the invention, the forward end 30 of the full plug 24 is provided with a pointed member 32 of hard material, and the plug body 25 and the rigid pointed member 32 are fixedly retained, this retention as plug 24 here shown as being by a forward tip end 25a of the plug body 25 being retained in a bore 32a of the pointed member 32, with suitable glue and/or crimping assuring that retention; and as shown herein the carrier member 16 provides novel and advantageous means for inserting the plug member 24 into the casing hole 12 for effectively sealing the hole 12, both the body 25 and the pointed member 32 then remaining in the casing 14. (FIG. 7).

Figure 2:
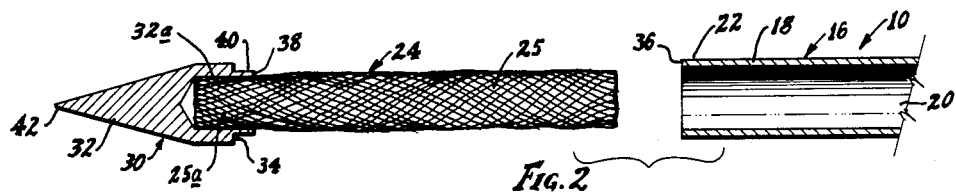
FIG. 2, in larger scale, is a vertical cross-sectional view of the plug-carrier member and its rigid and pointed end member, the latter being shown as carrying a repair plug body, in a step of assembly in which the plug body is about to be inserted into the forward end of the tubular carrier member of FIG. 1.

It will be noted that the pointed member 32 (FIG. 2) has what may be referred to as a first abutment 34 facing the plug member body 25, i.e., rearwardly as the plug member 24 is used; and the carrier member tube 18 has a forwardly facing abutment here called a second abutment 36 provided at the forward end 22 of the carrier tube 18, i.e., the forward direction as the plug member 24 and device 10 is being used.

An inner shoulder 38 extends rearwardly from the abutment 34, the outside surface 40 of the shoulder 38 (FIG. 2) fitting closely within the carrier wall 18's forward wall end 22 and abutment 36, holding forceful alignment of the pointed member 32 and carrier tube 18 during use.

Figure 3:
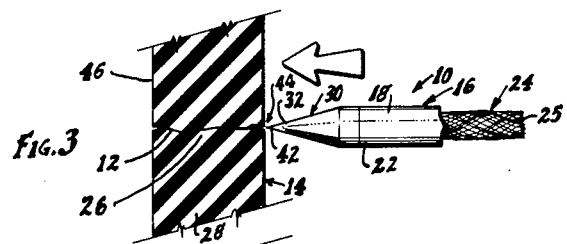
FIGS. 3 through 7, generally of the same scale of FIG. 1, are sequential views illustrating the use of the device in repairing a puncture hole of a tire casing, the casing being shown in cross-section at the region of the puncture hole, and the tubular carrier member being shown only fragmentally to illustrate the use of the tool; and more particularly.

The arrangement and operativity thus provides as follows: The body 25 of the plug member 24 is inserted into the bore 20 of the walls 18 of the tubular carrier member 16 with the pointed member 32's first abutment 34 then facing rearwardly, and the point 42 of the pointed member 32 is placed (FIG. 3) against the casing 14 at the entrance 44 of the casing hole 12. Then the user applies a pushing force to the handle 23, which force is then imparted to the carrier member 16, and is transmitted, through the abutting contact of the first and second abutments 34 and 36, of the pointed member 32 and carrier tube 18, respectively, to the pointed member 32.

Figure 4:
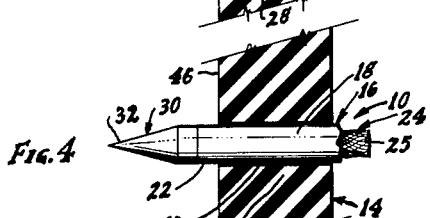

Upon continuation of such force, the pointed member 32 is caused to travel inwardly of the tire casing 14, pulling the plug member body 25 correspondingly into the hole 12 of the tire casing 14. (FIG. 4).

As shown in the drawings, the plug member body 25 during that movement is operatively shielded from any holding effect of the casing walls 26 adjacent the casing hole 12 by the carrier member 16's tubular wall 18, even though the casing 14's inherent resiliency urges its hole-walls 26 inwardly.

Figure 5:
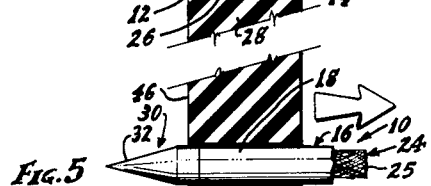
Figure 6:

Then, after the plug member 24 is sufficiently (FIG. 4) forced inwardly of the tire casing 14 that the pointed member 32 has traveled inwardly of the inner wall 46 of the casing 14, a rearward or pulling force is applied (FIG. 5) on the carrier member 16 by the user pulling outwardly on handle 23. The resilient retention of the plug body 25 by the tubular walls 18 of carrier 16 (aided by the holding effect of any glue if used), and the retention (25a/32a) of plug body 25 and the rigid member 32 thus causes the plug body 25 and pointed member 32 to move outwardly of the tire casing 14; but the casing 14's walls 26 adjacent the casing hole 12, as the carrier member 16 and the interconnected plug member body 25 and pointed member 32 are moving in an outward direction, engage the pointed member 32 and hold it and the plug member body 25 connected thereto from further outward movement. (FIGS. 5-7).

Thus the plug member body 25 is left disposed in the casing hole 12, effectively sealing the hole 12, as the carrier member 16 is further pulled outwardly of the tire casing 14 and thence pulled free from both casing 14 and the plug member 24's parts 32 and 25, by the final stages (FIG. 6) of pulling outwardly on the device's handle 23 and tube 16.

It will be noted (FIGS. 8 through 11) that the forward end 22 of the carrier member 16's tube 18, and the end 34 of the pointed member 32 adjacent the plug member body 25, are provided with lug means, respectively shown as 22a and 30a, which abuttingly interengage circumferentially if and when the support tube 18 of the carrier member 16 is rotated; and this provides that a twisting rotation of the device 10's support tube 16/18 during insertion of the plug member 24 and tubular walls 18 will cause a corresponding twisting rotation of the pointed member 32, this rotation facilitating the ease of forcing of the pointed member 32 into the tire casing 14, yet nevertheless permitting separation of the carrier member 16 and the plug member 24 (interconnected pointed member 32 and plug member body 25) merely by axial withdrawal of the carrier member 16 as the carrier member 16 is being pulled outwardly of the tire casing 14.

More particularly as to the feature of the interengaging lugs 22a and 30a, each of the lug means 22a and 30a as shown of the carrier member 16 and the pointed member 32, respectively, are about 90° in circumferential extent, and there are two of those lug means 22a and 30a respectively provided for each of the carrier member 16 and the pointed member 32, spaced generally diametrically with respect to the members (16/22 and 32) on which they are respectively carried.

Further as shown, the lug means 22a and 30a are shown provided by providing slots inwardly and axially extending from the adjacent end face 36 and 34 of the carrier member 16 and the pointed member 32 respectively. Such slots are shown as 50 and 52, respectively.

Figure 12:
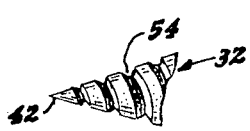
FIG. 12, in larger scale, illustrates a pointed end member, which has been provided with a screw-type outer surface for ease of insertion into a tire casing when inserted with a twisting motion, as is achieved by the embodiment of FIGS. 8 through 11.

FIG. 12 illustrates a screw-type surface 54 on the rigid pointed member 32, helping penetration of the casing 14, particularly helpful in an embodiment (e.g., FIGS. 8–11) in which lugs assure twist imparted to the pointed member 32.

SUMMARY OF OPERATIVITY AS PER THE CONCEPTS OF THE COMBINATION FURTHER EMPHASIZES DISTINCTIONS OVER THE PRIOR ART

In operation, with a carrier member 16 and a plug member body 25 inserted into the bore 20 of the carrier member 16, the first step is to push on the handle 23, to cause (FIG. 3) the carrier tube 16 to act through the merely abutting contact of the first and second abutments 34/36, and helped if desired by twisting the handle 23 to act through lugs 22a/30a to twist the pointed member 32, to force the pointed member 32 inwardly of the tire casing 14, the pointed member 32 thus pulling the plug member body 25 correspondingly into the hole 12; and the plug member body 25 during that movement is shielded from the holding effect of the casing walls 26 by the carrier member's wall 18. (FIG. 4).

Subsequently, rearward force applied to the carrier member handle 23 causes it to move outwardly of the tire casing 14; and in that retraction effort several features co-operate, as now summarized. (FIGS. 5–7).

That is, the retention of the plug member body 25 in the tubular carrier 16 causes it to correspondingly begin to be pulled outwardly; and the plug body 25 is shielded during that movement by the tubular carrier member 16 blocking the resilience of the tire casing 14 from causing it to grab or embrace the plug member body 25.

Also, the retention of the pointed member 32 and plug member body 25 correspondingly pulls the pointed member 32 by the plug body 25; but the yieldability of the retention of the plug member body 25 in the tubular carrier member 16 permits that carrier member 16 to move outwardly relative to the plug member body 25 when the plug member body 25 gets stopped from further outward movement, and the axial contact between the first and second abutments 34/36 is of merely-abutting nature, permitting separation of the pointed member 32 and the carrier member 16. (FIG. 6).

Further, the outward movement of the pointed member 32, as it is being pulled outwardly by the plug member body 25, and the pointed member 32 being inwardly of any shielding effect of the tubular carrier member 16, provides that during the outward movement of the pointed member 32 the pointed member 32 encounters the tire casing 14, stopping outward movement of the plug body 25 connected to the pointed member 32; and the tubular carrier member 16 having caused the casing walls 26 to be resiliently deformed, the withdrawal of the carrier member 16 permits the casing portions 26 adjacent the casing hole 12 to move toward the casing hole 12 and to engage the pointed member 32, holding it from further outward movement.

The still-connected nature or retention of the pointed member 32 and the plug member body 25 causes the holding of the pointed member 32 by the casing 14/26 to also hold the plug member body 25 against outward movement during subsequent outward movement of the carrier member 16 once the plug body member 25 has moved outwardly far enough for the casing 14/26 to hold the pointed member 32.

Thus, the seal is completed; i.e., the plug member body 25 is left disposed in the casing hole 12 and held therein, as the carrier member 16 is then further pulled outwardly of the tire casing 14 to be then free from both the casing 14 and the plug member body 25.

The tire plug 10 is quite safe and reliable for its intended use of repair of small leaks or punctures which do not destroy the mechanical strength or integrity of the tire casing 14, for the flexibility of the plug body 25 easily accommodates to whatever is the shape of the casing hole 12 and its casing walls 26, especially if some rubber cement is used on the plug body 25 prior to its insertion into the carrier 16. Moreover, even without an enlarged inner end to achieve a rivet-effect, the cross-sectional size is so small that very little air force is pushing outwardly on it, as shown by the equation $F = AP$, where "F" is the total force, "A" is the cross-sectional area in a range of about only 0.01 sq. in., and "P" is the tire pressure; and thus even if the tire pressure of its inflation were quite high over the conventional 32 p.s.i., the plug blow-out force would be less than even 1 pound, easy resisted by even a minimum friction of the force of the tire casing walls 26 against the circumference of the plug body 25.

CONCLUSION

It is thus seen that this device or kit, according to the inventive concepts, provides a desired and advantageous means and procedure for repairing a tire casing puncture, by an advantageous and easy hole-plugging procedure, yielding the advantages of ease and economy of tire plugging long a goal of many prior art attempts over many years, achieving in this novel combination a means and process of tire repair having advantages not otherwise achieved even though the present system utilizes certain existing and known concepts of the prior art's use of concepts individually although not in the novel and overall combination here achieved.

Accordingly, it will thus be seen from the foregoing description of the invention according to these illustrative embodiments, considered with the accompanying drawings, that the present invention provides new and useful concepts in combination, which provide and achieve a novel and advantageous means and process for a tire-plugging achievement, providing characteristics of convenience, reliability, ease, only a minimum of manual force and of manual skill, lack of need to dismount the tire, certainty of the repair, lack of need of a multiplicity of sizes, lack of criticality of how far the device's tubular walls 16/18 penetrate the casing 14 before the user begins the tool-withdrawal step, etc., yielding desired advantages and characteristics of use, cost, and effectiveness, and accomplishing the intended objects and details of the achievements including those details hereinabove pointed out and others which are inherent in the invention.

Modifications and variations may be effected without departing from the scope of the novel concepts of the invention; accordingly, the invention is not limited to the specific embodiments or form or arrangement of parts herein described or shown.

I claim:

1. A tire repair tool means for repairing a puncture or other hole in a tire casing, comprising, in combination:

a tubular carrier member having a tubular exterior wall and a hollow bore extending rearwardly a substantial distance from the forward end thereof, the distance being sufficient at least to fully receive a plug member body as specified below, and of an outer diameter greater than that of the casing hole, a plug member body formed of operatively pliable material of a nature for sealing against the walls of the casing hole, the plug member body being of slender form whose cross-sectional size and shape is such as to be receivable within the carrier member's bore, but large enough relative to the bore as to be yieldingly retained therein, and of a length to operatively be retained in the casing wall when caused as specified below to be disposed in a direction generally perpendicular to the portion of the tire casing having the hole therein to be repaired, the forward end of the plug member body being provided with a rigid pointed member of hard material, and the plug member body and the pointed member being fixedly retained, and together providing a plug member, the pointed member in the region of its first abutment specified below being of a sufficiently large size relative to the size of the carrier member as to provide plug member retention by the tire casing as specified below during outward pull of the carrier member without any other axial force being applied to the plug member body to hold the plug member in the casing during such outward pull of the carrier member, the pointed member having a first abutment facing the plug member body, and the carrier member having a forwardly facing second abutment, the arrangement providing that if the plug member body is inserted into the bore of the tubular carrier member, the said first abutment then facing rearwardly, and with the point of the pointed member entering the casing hole, a force imparted to the carrier member is transmitted, through the abutting contact of the said first and second abutments, to the pointed member which upon continuation of such force is caused to travel inwardly of the tire casing and pull the plug member body correspondingly into the hole of the tire casing, the plug member body during its said movement being shielded from the holding effect of the casing walls adjacent the casing hole by the carrier member's tubular wall, and then rearward force applied to the carrier member will cause it to move outwardly of the tire casing, and the features mentioned above then causing or permitting all of the following:

(a) the plug member body, due to its retention in the tubular carrier member, is caused to correspondingly move outwardly, for an initial portion of outward movement of the tubular carrier member, (b) the shielding effect of the tubular carrier member blocks the resilience of the tire casing from causing the tire casing to embrace the plug member body during the said initial portion of outward movement, and thus prevents the tire casing from blocking that initial outward movement of the plug member body, (c) the retention of the pointed member and plug member body correspondingly causes the pointed member to also be moved outwardly as the plug member body is moving outwardly in correspondence to the initial portion of the outward movement of the tubular carrier member, (d) the yieldability of the retention of the plug member body in the tubular carrier member permits the tubular carrier member to move outwardly relative to the plug member body when the plug member body is caused to stop its outward movement as specified below, (e) the merely-abutting nature of axial contact between the said first and second abutments permits separation of the pointed member and the carrier member during outward movement of the carrier member, even though during inward movement of the carrier member they are operatively connected to achieve the casing-penetrating thrust operativity mentioned above, (f) the outward movement of the pointed member, as it is being pulled outwardly by the plug member body, and the pointed member being inwardly of any shielding effect of the tubular carrier member, provides that during the outward movement of the pointed member, the pointed member encounters the tire casing, (g) the tubular carrier member's size having caused the casing walls to be resiliently deformed, provides that the casing portions adjacent the casing hole move toward the casing hole as the carrier member is moved outwardly; and thus by some portion of the tire casing engaging the pointed member, the pointed member is operatively held from further outward movement, (h) the retention of the pointed member and the plug member body causes the said holding of the pointed member by the casing to also hold the plug member body against outward movement during subsequent outward movement of the carrier member once the plug body member has moved outwardly far enough for the casing to hold the pointed member, (i) and thus the plug member body is left disposed in the casing hole and held therein as the carrier member is then further pulled outwardly of the tire casing to be free from both the casing and the plug member body.

2. The invention as set forth in claim 1, in a combination in which the forward end of the carrier member, and the end of the pointed member adjacent the plug member body, are provided with lug means which abuttingly interengage circumferentially as the carrier member is rotated, thereby providing that a twisting rotation of the carrier member during insertion will cause a corresponding twisting rotation of the pointed member, facilitating the forcing of the pointed member into the tire casing, yet permitting separation of the carrier member and the interconnected pointed member and plug member body merely by axial withdrawal of the carrier member as the carrier member is being pulled outwardly of the tire casing.

3. The invention as set forth in claim 2 in which each of the lug means of each of the carrier member and the pointed member are about 90° in circumferential extent, there being two of said lug means provided for each of the carrier member and the pointed member, and they are spaced generally diametrically with respect to the members on which they are carried.

4. The invention as set forth in claim 3, in which the lug means are provided by providing a slot inwardly and axially extending from the end face of the carrier member and the pointed member respectively.

5. The invention as set forth in claim 2, in which the lug means are provided by providing a slot inwardly and axially extending from the end face of the carrier member and the pointed member respectively.

6. The invention as set forth in claim 2, in which the pointed member is provided to have a screw type surface, facilitating the penetration of the casing as the carrier member is caused to be twisted and the twisting force is caused to be transmitted by the lug means cooperatively provided by the carrier member and the pointed member.

* * * * *

UNITED STATES PATENT AND TRADEMARK OFFICE
CERTIFICATE OF CORRECTION

PATENT NO.   :   4,716,792
DATED        :   January 5, 1988
INVENTOR(S)  :   Dwight H. Hector It is certified that error appears in the above—identified patent and that said Letters Patent is hereby corrected as shown below:

<u>Col. 2, line 67</u>;   After "springs" there should be a comma (,).

<u>Col. 3, line 18</u>;   The word "and" should be "an".

<u>Col. 5, line 11</u>;   The word "found" should be "formed".

<u>Col. 5, line 43</u>;   The word "reparied" should be "repaired".

<u>Drawing Figure 1, and also the Figure which appears on the page showing the Abstract</u>;   The reference numeral "22<u>a</u>" should be "22<u>d</u>".

Signed and Sealed this

Sixteenth Day of August, 1988

Attest:

DONALD J. QUIGG

*Attesting Officer*          *Commissioner of Patents and Trademarks*